United States Patent [19]

Miles et al.

[11] Patent Number: 5,020,714
[45] Date of Patent: Jun. 4, 1991

[54] METHOD AND PRESS APPARATUS FOR MANUFACTURING

[75] Inventors: Larry N. Miles; Cecil A. Drinnen; David W. Hackler, all of Wichita; Tom L. Bogart, Pratt, all of Kans.; Arnold D. Macklin, Newkirk, Okla.; Ben E. Sharpsteen; Truett M. Hyles, both of Wichita, Kans.; Herschel M. Stephens, Haysville, Kans.

[73] Assignee: The Boeing Company, Seattle, Wash.

[21] Appl. No.: 336,900

[22] Filed: Apr. 12, 1989

[51] Int. Cl.[5] .............................................. B23K 37/04
[52] U.S. Cl. ................................. 228/15.1; 228/44.3; 228/173.6; 228/212; 269/46; 100/226; 100/228; 100/236
[58] Field of Search ................... 228/173.2, 173.6, 182, 228/212, 213, 15.1, 44.3; 100/226, 228, 231, 236, 258 R; 244/123, 125; 269/46

[56] References Cited

U.S. PATENT DOCUMENTS

| | | | |
|---|---|---|---|
| 2,579,176 | 12/1951 | Dalton | 100/226 |
| 3,094,958 | 6/1963 | Gruetjen | 228/213 |
| 3,207,503 | 9/1965 | Clover, Jr. et al. | 228/212 |
| 3,495,527 | 2/1970 | Lafreniere | 100/226 |
| 3,826,188 | 7/1974 | Eberle | 100/226 |
| 3,896,717 | 7/1975 | Schmitt | 100/231 |
| 4,071,942 | 2/1978 | Kowallik | 228/173.6 |

FOREIGN PATENT DOCUMENTS

| | | | |
|---|---|---|---|
| 126693 | 5/1988 | Japan | 228/212 |
| 863282 | 1/1981 | U.S.S.R. | 228/44.3 |

Primary Examiner—Sam Heinrich
Attorney, Agent, or Firm—Finnegan, Henderson, Farabow, Garrett & Dunner

[57] ABSTRACT

A method and apparatus for applying variable pressure to selected areas of a bonding assembly jig to shape a face plate to conform to the contours of contoured heads and hold the face plate in place for welding comprises two inverted U-shaped support frames including two spaced apart elongated vertical support members each having a bottom end and a top end, an elongated horizontal top beam extending between and connecting the top ends of the vertical support members, a track extending between and adjustably fastened to the horizontal top beam, and at least one hydraulic press slidably suspended from the track and adapted to apply pressure to a bonding assembly jig. The support frames are provided with wheels and one of the support frames has vertical support members spaced at a distance less that of the other support frame. This arrangement allows the tracks of each frame to be positioned proximate to each other above a bonding assembly jig.

20 Claims, 4 Drawing Sheets

METHOD AND PRESS APPARATUS FOR MANUFACTURING

BACKGROUND OF THE INVENTION

1. Field of the Invention

This invention relates to a method and press for manufacturing a bonding assembly jig.

2. Description of The Related Art

Specialized airplane fuselage and wing components are often manufactured using bonding assembly jigs (BAJ's) as the mold to form the final product. A typical BAJ consists of a contoured header and a face plate that conforms to and is welded to the header. The header is a structural support formed from NC machined parts to define the desired contour. The face plate is a planar aluminum sheet typically ¼ to 1 inch thick. Traditional BAJ construction requires the face plate to be manually heated, hammered, cut, and bent with clamps and chains in order to shape it to conform to the contours of the header. Throughout the process as portions of the face plate are shaped, they are clamped and then spot welded to the structural support of the header.

An inherent problem with the prior art method is that this manual process is extremely time-consuming and labor intensive. Manufacture of a typical BAJ by the prior art method requires approximately 80 man-hours of labor and a welder on stand-by throughout the process.

In addition, since heavy sledge hammers are used to bend the face plate, and since the face plate must be heated with a torch, the BAJ assembly process can be very dangerous.

The instant invention has overcome many of the disadvantages of the prior art by providing a press which bends the face plate to conform to the contours of the header and which holds the face plate in position for welding. Using the invention, a typical BAJ construction requires 16 man-hours and a welder whose time is fully used.

SUMMARY OF THE INVENTION

The objects and advantages of the invention may be realized and attained by means of the instrumentalities and combinations particularly pointed out in the appended claims.

The invention is a ram press for applying variable pressure to selected areas of a bonding assembly jig to shape a face plate to conform to the contoured surface of a header and to hold the face plate in place for welding which comprises at least one invented U-shaped support frame including two spaced apart elongated vertical support members each having a bottom end and a top end, and an elongated horizontal top beam extending between and connecting the top ends, a track extending between the vertical support members, fastening means for adjustably fastening the track to the support frame for vertical movement of the ends of the track relative to the horizontal support beam, and at least one press means slidably suspended from the track.

Preferably the ram press of the invention has two support frames one of which has vertical support members spaced apart at a distance less than that of the other support frame.

The invention further includes a method of manufacturing a bonding assembly jig including a face plate and a structural support having a perimeter and internal cross members defining a contoured surface, the method comprising the steps of positioning the structural support on a rigid surface, placing the face plate over the contoured surface of the structural support, selectively positioning a hydraulic press over a predetermined portion of the face plate, the hydraulic press adjustably depending from a frame and moveable with respect to the structural support, applying pressure with the press to the face plate to conform the portion of the face plate to the contoured surface, welding the portion of the face plate to the contoured surface while applying the pressure, and repeating the locating, applying and welding steps at successive predetermined portions of the plate to conform and fix the plate to the contoured surface of the structural support.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

Figure 1:
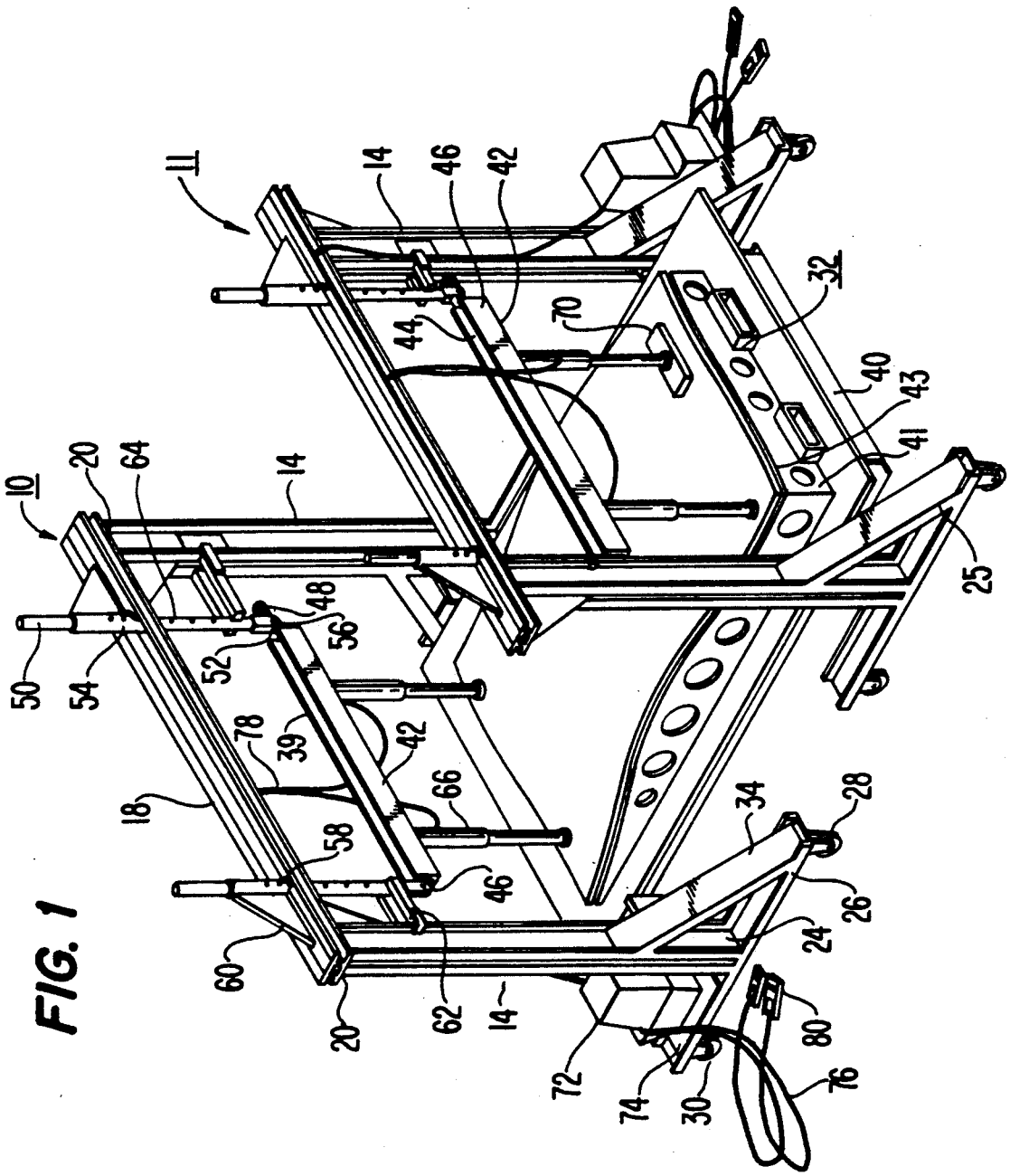
FIG. 1 is an oblique drawing of the ram press in accordance with the present invention.

Reference will now be made in detail to the preferred embodiments of the invention, examples of which are illustrated in the accompanying drawings.

In accordance with the invention, the ram press comprises at least one invented U-shaped support frame including two spaced apart elongated vertical support members each having a bottom end and a top end, and an elongated horizontal top beam extending between and connecting the top ends of the vertical support members. In the first embodiment as depicted in FIGS. 1-3, the ram press includes U-shape support frame 10 having elongated vertical support members 14 connected at their upper portions 20 to the ends of elongated top beam 18.

In the preferred embodiment, elongated base members 26 are perpendicularly attached at their mid-points to the bottom ends 24 of vertical support members 14. The base members 26 are provided with wheels 28 and 30 at both ends to allow the frame to be moved about bonding assembly jig (BAJ) 32. The base members 26 are each provided with diagonal stabilizing beams 34 that connect one end of the elongated base member 26 with an area on the vertical support members at a predetermined distance from the bottom end 24.

Preferably, table supports 36 having platform portions 38 that face towards the center of the U-shaped frame 10 are attached to the lower ends of vertical support members 14. The table supports 36 are disposed to engage the edges of working table 40 to counter the force exerted by presses 66.

Figure 3:
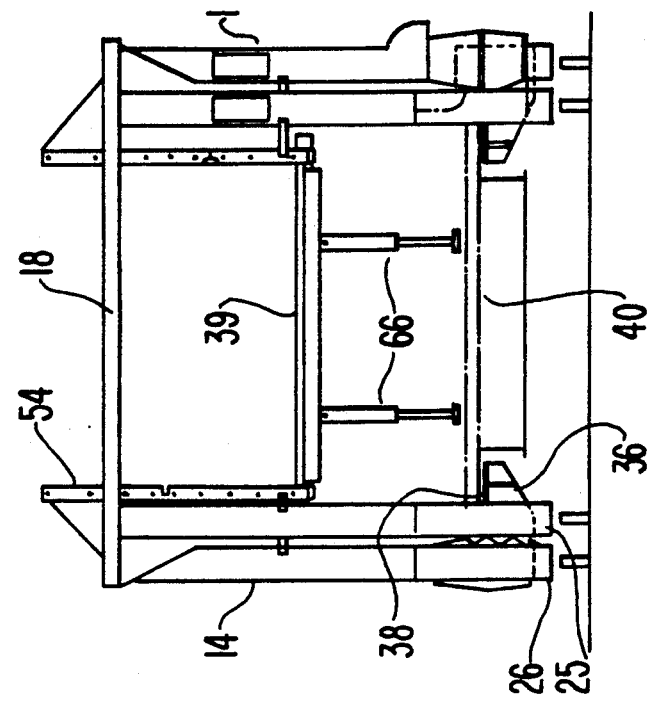
FIG. 3 is a front elevation of the ram press of FIG. 1.
Figure 2:
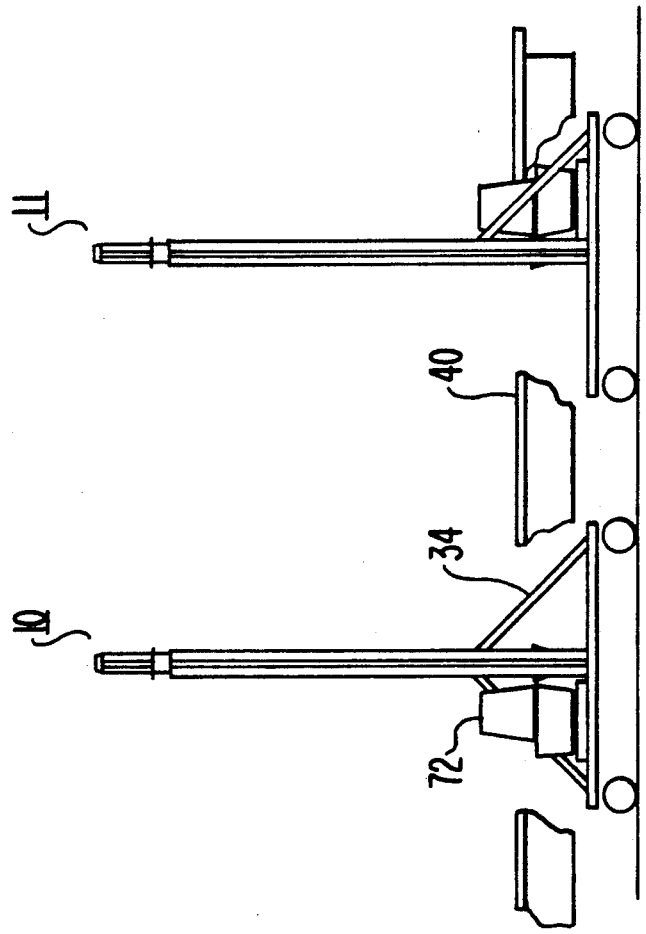
FIG. 2 is a side elevation of the ram press of FIG. 1.
Figure 4:
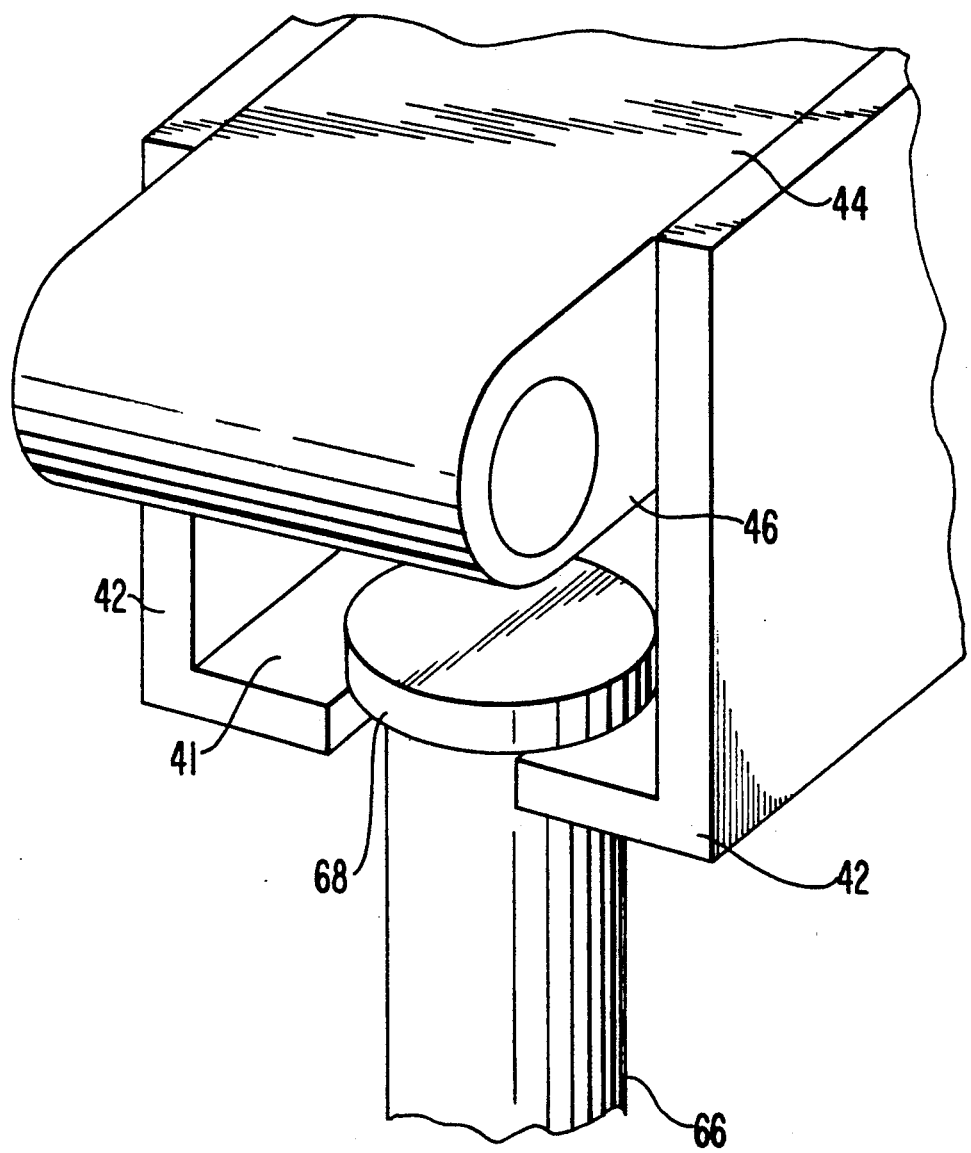
FIG. 4 is an enlarged drawing of one end of the track shown in FIG. 1.

It is preferred that the ram press includes two U-shaped support frames 10 and 11 as depicted in FIGS. 1-3. In the preferred embodiment, one of the two support frames 11 has vertical support members 14 spaced closer together than those of the other support frame 10. In this arrangement, the base members 25 of the narrower frame 11 can be moved between the base members 26 of wider support frame 10. This allows presses 66 from both support frames 10 and 11 to be used in a position close to one another.

Figure 5:
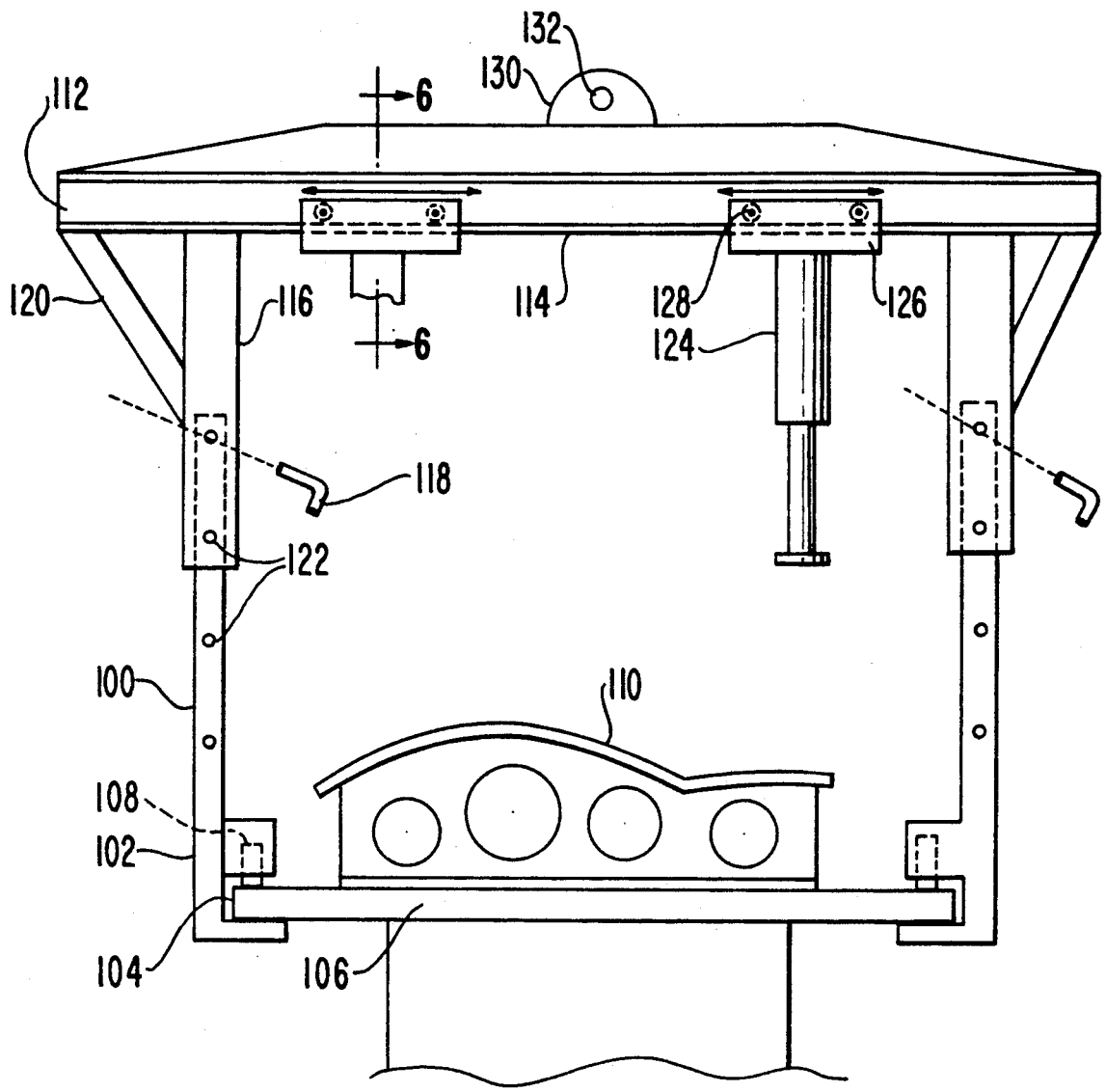
FIG. 5 is a schematic diagram of a second embodiment of the present invention.
Figure 6:
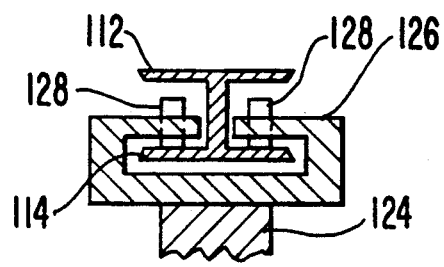
FIG. 6 is a cross-sectional view taken along line VI—VI in FIG. 5.

In the second embodiment depicted in FIGS. 5 and 6, bottom ends 102 of vertical support members 100 have C-brackets 104 that slide over the edges of weld table top 106. The C-brackets 104 are provided with wheels 108 disposed to roll on working table 106. This arrangement allows the support frame to be selectively moved about BAJ assembly 110.

In addition, the horizontal top beam 114 is provided with a means for lifting the support structure from the work surface. As embodied herein, means for lifting is an ear 130 mounted at approximately the mid-point of the top side of horizontal top beam 114. The ear is provided with a hole 132 disposed to engage a lifting device.

In accordance with the invention, the ram press also comprises a track extending between the vertical support members. As embodied herein, track 39 includes elongated bar 44 extending between two spaced apart elongated L-beams 42. The bar has a bored end 46 and an elongated slotted end 48. The L-beams 42 face each other so as to form a track.

In a second embodiment as depicted in FIGS. 5 and 6, horizontal top beam 112 is an I-beam having ridges 114 that serve as a track.

In accordance with the invention, the ram press includes fastening means for adjustably fastening the track to the support frame for vertical movement of the ends of the track relative to the horizontal top beam. As embodied herein, the fastening means comprises elongated rods 50, brackets 52, sleeves 54, fixed pins 56 and removable pins 58. The brackets 52 are mounted on the ends of each rod 50 and are pivotably connected to the ends 46 and 48 of track 39 by fixed pins 56. At least one end 48 includes an elongated slot adapted to receive pin 56 and allow track 39 to be adjusted to positions not parallel to beam 18. The rods 50 extend through sleeves 54 that are perpendicularly mounted to the top beams 18 of the U-shaped support frames 10 and 11. A series of holes 64 extend through the sleeves 54 and the rods 50 and are disposed to receive removable pins 58. When pins 58 are removed, rods 50 can be slid up or down within sleeves 54 to adjust the distance between the ends of track 42 and horizontal top beam 18. Triangular stabilizers 60 connecting the top portion of sleeves 54 to top beams 18 and finger stabilizers 62 connecting the bottom portion of sleeves 54 to vertical support members 14 are provided for mounting and stabilizing sleeves 54 on support frames 10 and 11.

In a second embodiment, sleeves 116, vertical support members 100, and removable pins 118 allow the height of horizontal top beam 112 to be adjusted. Sleeves 116 are perpendicularly mounted on top beam 112 and are provided with additional support by diagonal stabilizing members 120 that connect the end portions of top beam 112 with sleeves 116. Sleeves 116 and vertical support members 100 are provided with a series of holes 122 adapted to receive pins 118. Pins 118 can be removed to allow sleeves 116 to slide on vertical support members 100 and thereby allow the height of track 114 to be adjusted relative to working table 106.

In accordance with the invention, the ram press includes at least one press means slidably suspended from the track and adapted to apply pressure to a bonding assembly jig. As embodied herein, press means slidably suspended from the track comprises at least one hydraulic press 66 having a nail-like head 68. The head 68 rests on ridges 41 of L-brackets 42. This configuration allow hydraulic presses 66 to be slid along track 39 formed by L-brackets 42.

Preferably, two presses 66 are slidably mounted on each track 39. It is also preferred that the pressed be powered by hydraulic power unit 72 that is positioned on power unit support platform 74 mounted on the side of base element 26 opposite diagonal stabilizing beams 34. Hydraulic tubing 78 connects presses 66 with power unit 72. Hydraulic tubing 76 connects hand controls 80 with power unit 72 and allows each press 66 to be operated individually. Blocks 70 can be placed between the bonding assembly jig and the presses 66 to spread the pressure created by presses 66 over a greater surface area of face plate 32.

In a second embodiment as shown in FIGS. 5 and 6, hydraulic presses 124 are mounted on carriages 126. The carriages 126 are provided with wheels 128 adapted to ride along ridges 114 of top beam 112.

In operation, a worker positions the structural support 41 of BAJ 32 on working table 40. Face plate 43 is placed over the contoured surface of the structural support 41 and selected edge portions of face plate 43 may be welded or clamped to structural support 41. At least one U-shaped support frame 10 is positioned about working table 40. Track 39 is then adjusted to a predetermined height and angle by removing pins 58, sliding rods 50 up or down in sleeves 54, and replacing pins 50 when the requisite adjustment has been made.

Hydraulic presses 66 are moved along track 39 to position the presses 66 over a predetermined portion of face plate 43. Once presses 66 are in position, a worker activates each press individually using hand controls 80. Hand controls 80 send hydraulic power from power unit 72 through tubing 78 to the individual presses 66 in order to exert a downward pressure on face plate 43. The pressure exerted by presses 66 conforms an area of face plate 43 beneath the presses 66 to the contoured surface of support structure 41. The worker then welds the conformed area of plate 43 to support structure 41. When welding is complete, the worker removes pressure from presses 66 using hand controls 80, and positions the presses 66 over a different area of face plate 43. This process continues until the entire face plate 43 is conformed and welded to support structure 41.

What is claimed is:

1. A ram press for applying variable pressure to selected areas of a bonding assembly jig to shape a face plate to conform to the contoured surface of a header and to hold the face plate in place for welding, comprising:

at least one inverted U-shaped support frame including two spaced apart elongated vertical support members each having a bottom end and a top end, and an elongated horizontal top beam extending between and connecting said top ends of said vertical support members;

a track extending between said vertical support members;

fastening means for adjustably fastening said track to said support frame for vertical movement of the ends of the track relative to the horizontal top beam;

at least one press means slidably suspended from said track and adapted to apply pressure to a bonding assembly jig.

2. A ram press as set forth in claim 1, also including a second support frame slidably suspending a second press means.

3. A ram press as set forth in claim 2, wherein one of said support frames has elongated vertical support members spaced apart at a distance less than that of the other.

4. A ram press as set forth in claim 1, wherein said fastening means includes two rods pierced with a series of transverse bores, and pivotally attached to ends of said track, two tubular sleeves mounted on said horizontal support member adapted to telescopically receive said rods each sleeve having at least one transverse bore adapted to be selectively aligned with one of said bores in said rod; and at least one pin adapted to coaxially extend through aligned transverse bores in said sleeve and said rod.

5. A ram press as set forth in claim 1, wherein said support frame further comprises a base element attached to the bottom ends of each said vertical support member, each said base element including wheels to allow said support frame to be selectively positioned relative to said bonding assembly jig.

6. A ram press as set forth in claim 1, wherein said fastening means includes a pivot portion connecting said track to said rods and allowing the track to pivot relative to said rods.

7. A ram press as set forth in claim 1, wherein said track includes two L-brackets having platform portions disposed to face each other and said press means includes a nail-like head disposed to slide on said platform portions of said track.

8. A ram press as set forth in claim 7, wherein said press means includes a hydraulic cylinder press.

9. A ram press as set forth in claim 7, wherein said press means includes two hydraulic presses.

10. A ram press as set forth in claim 1, further comprising blocks adapted to be positioned beneath said press means to spread pressure created by the press means over a broad area of the bonding assembly jig.

11. A ram press as set forth in claim 1, wherein each of said vertical support members includes table supports located proximate to said bottom ends and having platform portions disposed to provide support to a weld table top to counter the force of said press means.

12. A ram press as set forth in claim 9, wherein said press means further comprises a hydraulic system including a hydraulic power unit, hydraulic tubing connecting said power unit to said presses, and controls for operating each press independent of the others.

13. A ram press for applying variable pressure to selected areas of a bonding assembly jig positioned on a weld table top to shape a face plate to conform to the contours of contoured heads and hold the face plate in place for welding, comprising:

an inverted U-shaped support frame including two spaced apart elongated vertical support members each having a top portion and bottom a portion, said bottom portions adapted to movably engage a weld table top;

a horizontal top portion including a horizontal beam extending above said vertical support members, and two spaced apart sleeves extending perpendicularly from the ends of said horizontal beam and adapted to coaxially receive said top portions of said vertical support members;

at least one carriage movably mounted on said horizontal beam and adapted to move in a direction parallel to the length of the beam;

at least one press means adapted to be suspended from said at least one carriage.

14. A ram press as set forth in claim 13, further comprising at least one pin, said vertical support members having a co-linear series of spaced apart bores, said sleeves having at least one bore disposed to be selectively coaxial with said bores of said vertical support members, said pin adapted to coaxially extend through one of said bores in said vertical support member and one of said bores in said sleeve.

15. A ram press as set forth in claim 13, wherein said bottom portions of said vertical support members include C-shaped brackets disposed to engage the edges of a weld table top, and wheels disposed within said brackets to allow said vertical support members to roll on said table top.

16. A ram press as set forth in claim 13, wherein said horizontal top beam includes ridges, and said carriage has wheels disposed to roll along said ridges.

17. A ram press as set forth in claim 13, wherein said press means includes a hydraulic cylinder press mounted on said carriage.

18. A ram press as set forth in claim 13, wherein said at least one press means includes two presses, each mounted on a carriage.

19. A ram press set forth in claim 13, further comprising blocks adapted to be positioned beneath said presses to spread pressure created by the presses over a broad area of the bonding assembly jig.

20. A ram press as set forth in claim 13, wherein said press means further comprises a hydraulic system including a hydraulic power unit, hydraulic tubing connecting said power unit to said presses and controls for operating each press independent of the others.

* * * * *